United States Patent
Reeves, Jr. et al.

(10) Patent No.: US 8,973,099 B2
(45) Date of Patent: Mar. 3, 2015

(54) INTEGRATING ACCOUNT SELECTORS WITH PASSIVE AUTHENTICATION PROTOCOLS

(75) Inventors: Charles Ronald Reeves, Jr., Snohomish, WA (US); Oren J. Melzer, Redmond, WA (US); Michael Blair Jones, Kirkland, WA (US); Ariel N. Gordon, Kirkland, WA (US); Arun K. Nanda, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 453 days.

(21) Appl. No.: 12/815,413

(22) Filed: Jun. 15, 2010

(65) Prior Publication Data

US 2011/0307938 A1    Dec. 15, 2011

(51) Int. Cl.
G06F 7/04 (2006.01)
H04L 29/06 (2006.01)

(52) U.S. Cl.
CPC ............ H04L 63/08 (2013.01); H04L 63/1483 (2013.01); H04L 63/0823 (2013.01); H04L 63/101 (2013.01)
USPC ................ 726/3; 726/1; 726/2; 726/4; 726/5; 726/9; 726/12; 713/185; 705/64

(58) Field of Classification Search
USPC ........ 726/3, 1, 2, 4, 5, 9, 12; 713/185; 705/64
See application file for complete search history.

(56) References Cited

U.S. PATENT DOCUMENTS

| | | | |
|---|---|---|---|
| 2006/0200424 A1* | 9/2006 | Cameron et al. | 705/64 |
| 2007/0157304 A1* | 7/2007 | Logan et al. | 726/12 |
| 2007/0204325 A1 | 8/2007 | Cameron et al. | |
| 2008/0134295 A1* | 6/2008 | Bailey et al. | 726/4 |
| 2008/0178272 A1 | 7/2008 | Gajjala et al. | |
| 2008/0184339 A1* | 7/2008 | Shewchuk et al. | 726/3 |
| 2008/0196096 A1 | 8/2008 | Grynberg | |
| 2008/0222714 A1* | 9/2008 | Wahl | 726/9 |
| 2008/0229410 A1 | 9/2008 | Felsted et al. | |
| 2009/0064291 A1 | 3/2009 | Wahl | |
| 2009/0077655 A1* | 3/2009 | Sermersheim et al. | 726/20 |
| 2009/0089870 A1* | 4/2009 | Wahl | 726/9 |
| 2009/0204542 A1* | 8/2009 | Doman et al. | 705/50 |

(Continued)

OTHER PUBLICATIONS

Carmody, Steven., "Information Card Support", Retrieved at <<https://spaces.internet2.edu/display/SHIB2/Information+Card+Support >>, Sep. 23, 2008, pp. 2.
Chappell, David., "Digital Identity for .NET Applications: A Technology Overview", Retrieved at <<http://msdn.microsoft.com/en-us/library/bb882216.aspx >>, Aug. 2007, pp. 26.
Trevithick, Paul., "Interoperability Space", Retrieved at <<http://spwiki.editme.com/InteroperabilitySpace >>, Retrieved Date: Mar. 31, 2010, pp. 21.

(Continued)

Primary Examiner — Beemnet Dada
Assistant Examiner — Sayed Beheshti Shirazi
(74) Attorney, Agent, or Firm — Henry Gabryjelski; Sade Fashokun; Micky Minhas

(57) ABSTRACT

Described is using a client-side account selector in a passive authentication protocol environment (such as OpenID) in which a relying party website trusts the authentication response from an identity provider website. The account selector may access and maintain historical information so as to provide user-specific identity provider selection options (rather than only general identity provider selection options). The account selector is invoked based upon an object tag in the page, e.g., as invoked by a browser extension associated with that particular object tag. The account selector may communicate with a reputation service to obtain reputation information corresponding to the identity providers, and vary its operation based upon the reputation information.

20 Claims, 5 Drawing Sheets

(56) References Cited

U.S. PATENT DOCUMENTS

| | | | |
|---|---|---|---|
| 2009/0205014 A1* | 8/2009 | Doman et al. | 726/1 |
| 2009/0300716 A1* | 12/2009 | Ahn | 726/1 |
| 2009/0300747 A1* | 12/2009 | Ahn | 726/9 |
| 2009/0320095 A1* | 12/2009 | Nanda et al. | 726/2 |
| 2010/0005512 A1* | 1/2010 | Wahl | 726/4 |
| 2010/0011409 A1* | 1/2010 | Hodgkinson et al. | 726/1 |
| 2010/0031328 A1* | 2/2010 | Hodgkinson | 726/5 |
| 2010/0100926 A1* | 4/2010 | Binding et al. | 726/1 |
| 2010/0187302 A1* | 7/2010 | Sermersheim et al. | 235/380 |
| 2010/0250955 A1* | 9/2010 | Trevithick et al. | 713/185 |

OTHER PUBLICATIONS

Vittorio., "Otto Store: Walking through the CardSpace Experience", Retrieved at <<http://blogs.msdn.com/vbertocci/archive/2007/02/03/otto-store-walking-through-the-cardspace-experience.aspx >>, Feb. 3, 2007, pp. 6.

Nanda, et al., "Identity Metasystem Interoperability Version 1.0", Retrieved at <<http://docs.oasis-open.org/imi/identity/v1.0/identity.html >>, Jul. 1, 2009, pp. 41.

* cited by examiner

INTEGRATING ACCOUNT SELECTORS WITH PASSIVE AUTHENTICATION PROTOCOLS

BACKGROUND

Passive authentication protocols such as those based on the OpenID standard allow a user interacting with one website (a relying party) to redirect to and log onto another website or the like (an identity provider) that authenticates the user, e.g., a provider that hosts the user's OpenID URL. When authenticated, the user is returned back to and is authenticated on the relying party's website via an assertion for the relying party.

To facilitate redirection for authentication, each website/provider that participates provides a mechanism such as a form by which users interact. For example, the original way to interact was for a user to type a fully qualified URL into the form that named the identify provider and provided user-specific information. A more recent way (referred to as "directed identity") allows the user to type only simplified information that references the identity provider, e.g., xyz123.com. Participating websites further began offering a set of icons by which a user can connect to the authenticating provider with a single mouse click or the like instead of physically typing that simplified information.

However, having icons presents other problems, including usability. More particularly, as the number of participants has grown, to keep the number of icons to a reasonable amount, only a limited number of icons (e.g., for the most popular providers) can be presented to the user. Even with the limited amount of icons, many users find the various icons to be awkward in appearance, far more numerous than desired and/or confusing. Having a limited number of icons also means that other, less widely used participating providers (e.g., educational institutions) that do not have a presented icon are only accessible by typing, that is, users have to manually enter the URLs for those other providers. This makes the authentication process laborious for many users.

Another problem is that having icons results in a security risk. For example, a rogue website that a user is inadvertently browsing may appear to be a participating website with appropriately displayed icons. However, the icons presented on that rogue website do not link actually to the proper identity provider site, which the user will likely not realize. This makes the process vulnerable to phishing and other web-based attacks.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which client-side mechanisms including an account selector allow a user to select an identity provider from a client user interface rather than from the relying party's website. The account selector may access and maintain historical information and/or local user-configured information specific to that user with regard to previous identity provider usage, thus providing specific identity provider selection options (rather than only general identity provider selection options) for user selection.

When a passive authentication protocol sign-in page is received from a relying party, the account selector is invoked based upon particular data in the page, e.g., a particular object tag or other HTML markup. In one implementation, the browser invokes a browser extension when it detects the object tag during parsing, and the browser extension invokes the account selector.

The account selector provides the one or more identity provider options to a user for selecting an identity provider. This may include accessing historical information to present identity providers previously used by the user, presenting identity providers suggested by the relying party, and/or identity providers (and other information about those providers) obtained via a discovery process. When the user selects an identity provider, the account selector constructs an authentication request and sends the authentication request (e.g., via browser redirection) to the selected identity provider on behalf of the relying party. When received, the authentication response is then returned to the relying party.

In one aspect, the account selector communicates with a reputation service to obtain reputation information corresponding to the identity providers. The reputation information, for example, may correspond to data provided from a whitelist, a blacklist, a filtering service, a set of extended validation certificates, and/or a set of government-certified entities. Based upon the reputation information, the account selector may vary the appearance of the identity providers available for selection, e.g., by position and/or by highlighting some and not others, may provide visible warning prompts and the like for some and not others, and/or may remove a blacklisted identity provider.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards having local client-side mechanisms operate to authenticate a user to an identity provider website, (instead of selecting the identity provider via the remote relying party website). To this end, a browser extension or the like is provided with the authentication challenge information. The browser extension invokes a client-side account selector, which may leverage stored information such as account usage history, to enable the user to make a more informed and secure choice of which credentials are to be used to authenticate to the website. Note that this is more secure because past account usage history is used for authentication. This further allows for per-user personalization, e.g., because the history is maintained for the user at the client, each user may be presented with a list of one or more specific identity providers for that specific user, rather than a general set of icons limited to only major/popular identity providers.

It should be understood that any of the examples herein are non-limiting. For example, the OpenID protocol is mentioned in conjunction with a Windows®/Internet Explorer® operating system, however these are only examples, and other protocols and/or operating systems/web browsers may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and authentication in general.

Figure 1:
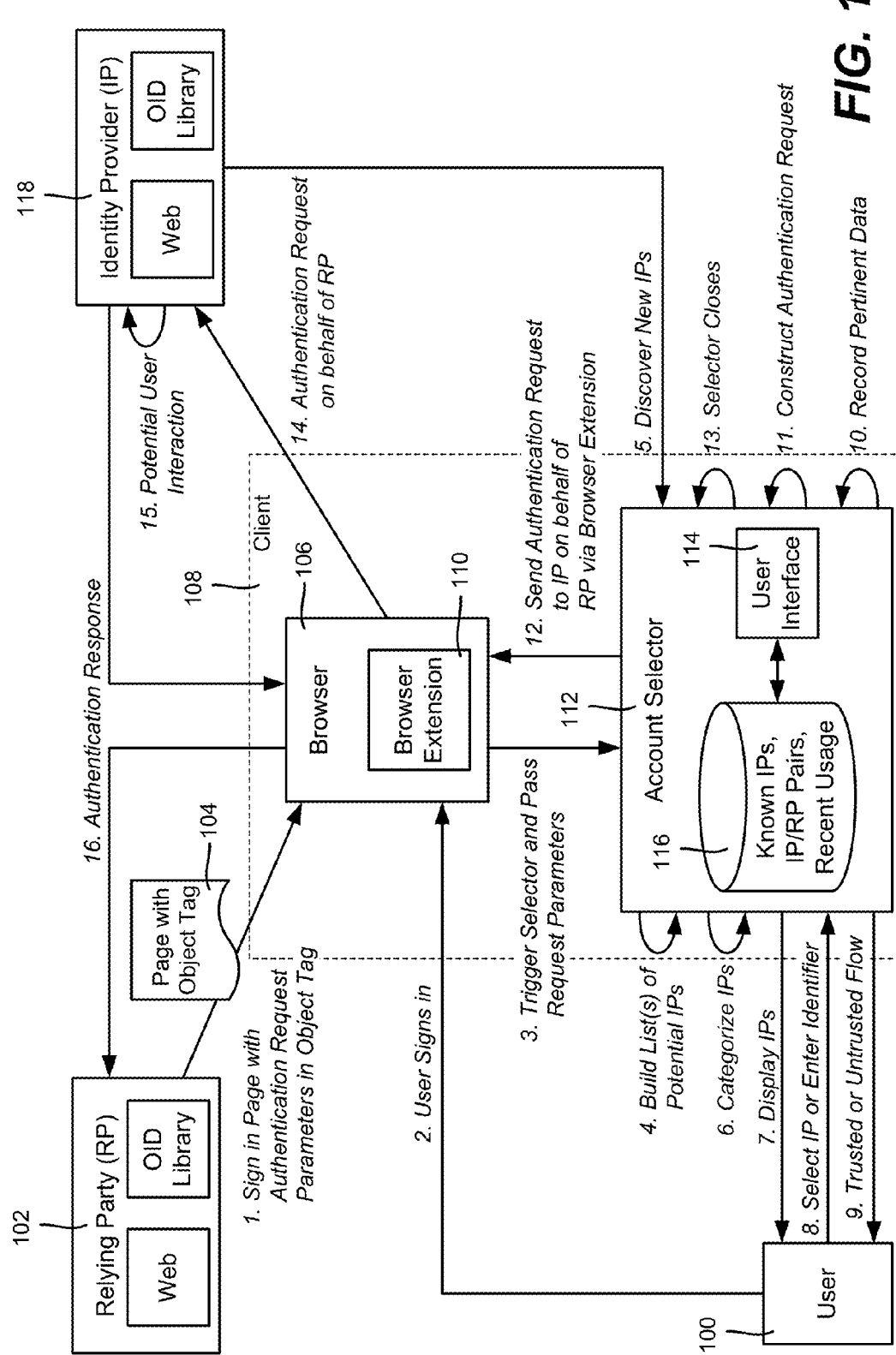
FIG. 1 is a block diagram representing client-side mechanisms including an account selector for selecting an identity provider based upon a relying party sign-in page in a passive authentication protocol environment.

FIG. 1 is a block diagram showing a system for authenticating a user 100 via client-side mechanisms according to the technology described herein. When the user 100 wants to authenticate, e.g., via an OpenID form or other mechanism provided on the relying party (RP) website 102, the relying party website 102 embeds an HTML object tag into a sign-in page 104 that is used to initiate the authentication process. This is represented in FIG. 1 by the arrow labeled with circled numeral one (1).

The browser 106 (on a client 108) receiving the sign-in page 104 parses the content, and when it processes the object tag, invokes a browser extension 110 associated with the MIME-type (or the like) referenced in the object tag. Note that the browser may be configured to operate without a browser extension, e.g., the code or the like of the browser extension may be incorporated into the browser code itself, rather than into an extension. An example object tag that includes authentication request parameters/constraints is shown below:

```
<html xmlns="http://www.w3.org/1999/xhtml" >
<head>
    <title>Account Selection in OpenID 2.0</title>
</head>
<body>
<object type="application/x-informationCard" id="infoCardObjectTag">
    <param name="protocol" value="http://specs.openid.net/auth/2.0" />
    <param name="tokenType" value="http://specs.openid.net/auth/2.0" />
    <param name="issuer" value="xyz123.com/accounts/xxx/id MS.com OpenID.com" />
    <param name="issuerExclusive" value="false" />
    <param name="OpenIDAuthParameters" value=
"openid.ns:http://specs.openid.net/auth/2.0
openid.return_to:http://www.abc123.com/openid?actionType=complete
openid.realm:http://*. abc123.com/
openid.ns.sreg:http://openid.net/extensions/sreg/1.1
openid.sreg.required:email
openid.sreg.optional:fullname,nickname,dob,gender,postcode,country,
language,timezone
openid.sreg.policy_url:http://www. xyz123.com/about/privacy_policy" />
</object>
</body>
</html>
```

When the page is rendered, the user 100 is given an opportunity to sign in (e.g., with OpenID) by interacting with the page, e.g., by clicking an icon or link. In this example, the user 100 chooses to sign in, as generally represented by the arrow labeled two (2).

When the user elects to sign in, the browser extension 110 invokes an account selector 112, passing the authentication request parameters (including constraints) in the object tag as arguments (the arrow labeled three (3)). Note that account selector technology (e.g. Windows CardSpace®) is built into contemporary operating systems/browsers on a client's computer. Thus, instead of having a user select or enter an identity provider (e.g. OpenID provider) on the relying party website, a browser extension is provided with the challenge information which is used to invoke the account selector, that is, the HTML object tag provides issuer and token constraints to the account selector via the browser mime-type handlers.

The account selector 112 includes an interactive user interface 114 with one or more display screens by which the user may select an identity provider, such as described below with reference to FIGS. 2 and 3. As part of the selection process, the account selector 112 may leverage stored information 116, such as account usage history to enable the user to make a more informed choice of which credentials will be used to authenticate to the identity provider website. As shown in FIG. 1, the stored information 116 may include information providers (IP) that the user has used before, other known information providers, pairings between relying parties (RPs) and information providers, recent usage information, and so forth.

As represented by the arrows labeled four (4) through six (6) in FIG. 1, the account selector 112 may build lists of information providers, including by discovering them (e.g., as known with OpenID). The account selector 112 may categorize the information providers in any way, including for example as known or unknown, or some other category, such as classified based upon data of a reputation service (as described below). The way in which an identity provider is displayed may vary based upon the categorization.

Figure 2:
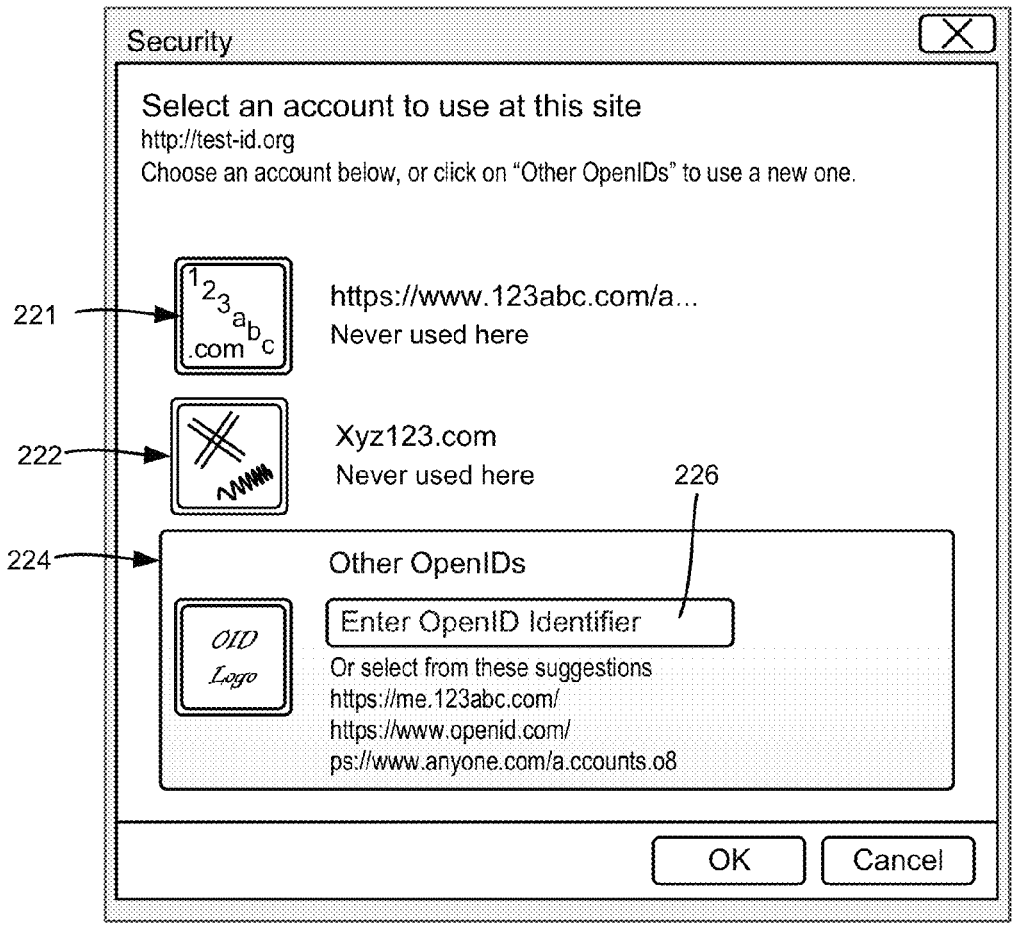
FIG. 2 is a representation of a user interface screen by which a user may select an identity provider via an account selector.

As represented in FIG. 2, the account selector 112 may present a list of authentication options that includes options for using a new identity provider (e.g., 221 and 222), including any recommended by the relying party (e.g., in block 224). Note that the process of discovery may be used to obtain images and/or more descriptive names representative of identity providers. The "Never used here" text indicates to the user that there is no maintained usage history for that particular identity provider.

Figure 3:
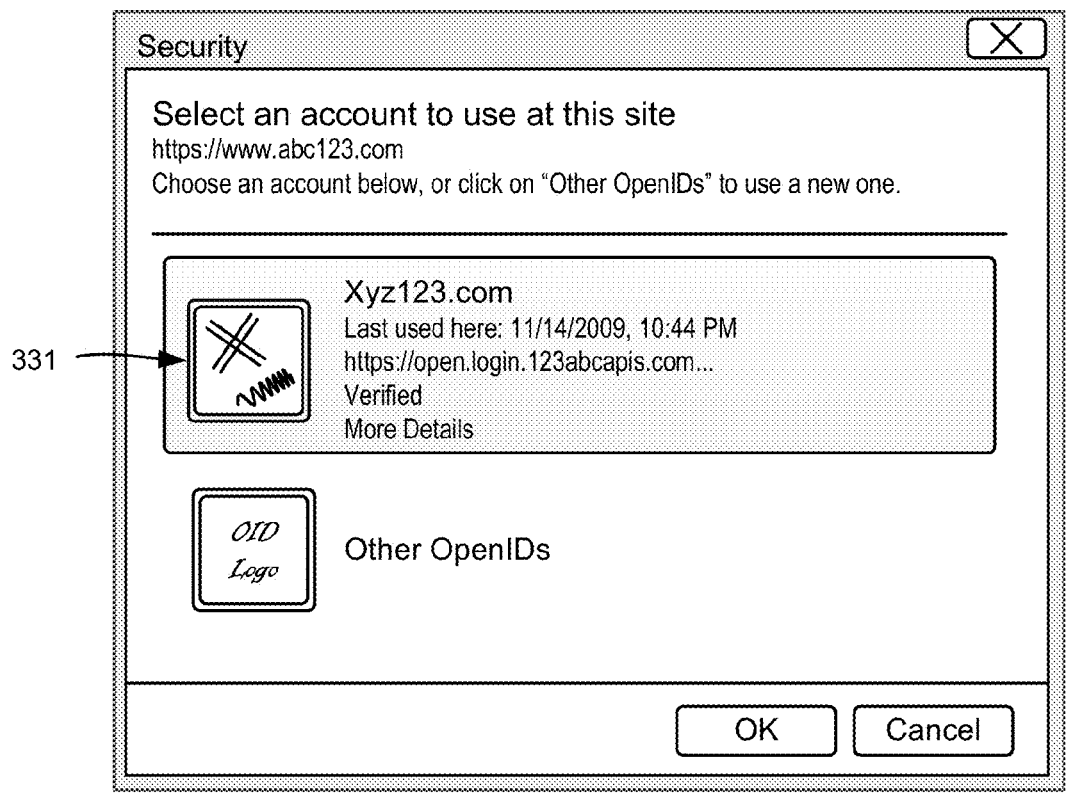
FIG. 3 is a representation of a user interface screen by which a user may select a previously used identity provider via an account selector.

As represented in FIG. 3, once there has been a previous usage as maintained in the stored information 116, the account selector 112 may present one or more identity providers previously used by the user, as well as information about that usage, e.g., time and date. In this example, the user may also interact to see additional details.

In a Windows CardSpace® implementation, OpenID providers may be presented as cards or tiles in the user interface. For example, previously used identity providers may be displayed using a distinct tile or item in the displayed list including a graphic, web address and information describing the most recent usage of the identity provider. New tiles may be added to the list using a tile specifically targeted at that function, by entering the address of a new identity provider (e.g., in the text-entry area 226 of FIG. 2) or selecting it from a suggested list or the like supplied by the relying party as an object tag parameter, (e.g., those with which the relying party has a particular relationship).

As can be readily appreciated, FIGS. 2 and 3 are only examples, and other user interface screens may be provided. For example, a user may be provided with a screen that shows any previously used identity providers in an upper portion, and any discovered/relying party website-suggested identity providers in a lower portion.

Returning to FIG. 1, the user is able to select an identity provider, as represented by the arrows labeled seven (7) through nine (9). In this example, the user 100 makes a selection and thus the process continues, with the account selector recording data (the arrow labeled ten (10)) regarding the selection in the information 116. For example, the account selector 112 retains details of the selection such as relying party address, date and time, identity provider, images, and so forth to support future account selection experiences (e.g., highlight or otherwise visibly indicate that identity provider as being previously used, to differentiate that identity provider from non-used ones).

Note that in one implementation, a selection need not be shown. For example, if the user has previously used a given identity provider for a given relying party, based upon the previous user interaction the selector may automatically select that provider again and automatically create an authentication request, without needing further user interaction.

The account selector 112 also constructs the authentication request (arrow eleven (11)). Further, once an identity provider has been selected, the account selector 112 returns the selection and authentication request back to the extension 110 (arrow twelve (12)), and then closes in this example (arrow thirteen (13)).

As represented by the arrow labeled fourteen (14), the browser extension 110 redirects the browser 106 to the selected identity provider website 118 for authentication and completion of remaining portions of the passive protocol. Note that arrows fifteen (15) and sixteen (16) in FIG. 1 represent how OpenID operates at present, and are only shown for completeness in FIG. 1.

In the event that a website does not provide the object tag that invokes the browser extension, the browser does not implement such an extension, and/or an account selector is not available on the client, the user may simply use the existing passive authentication protocol process, e.g., enter an identity provider via the relying party website. For example, the page/browser can be configured to dynamically determine whether an account selector is present, and if so, use the account selector mechanisms to let the user select an identity provider, and if not, present the existing user experience. Thus, the model allows properly configured clients/users to take advantage of installed account selection technology, yet preserves the ability for other users to use the existing redirection mechanisms.

Turning to another aspect, the technology described herein may include a security model for establishing the trustworthiness of identity providers that support the client-account selection authentication model. For example, the account selector 112 may dynamically acquire descriptive details of the identity provider using the discovery facilities available in the OpenID 2.0 standard.

Figure 4:
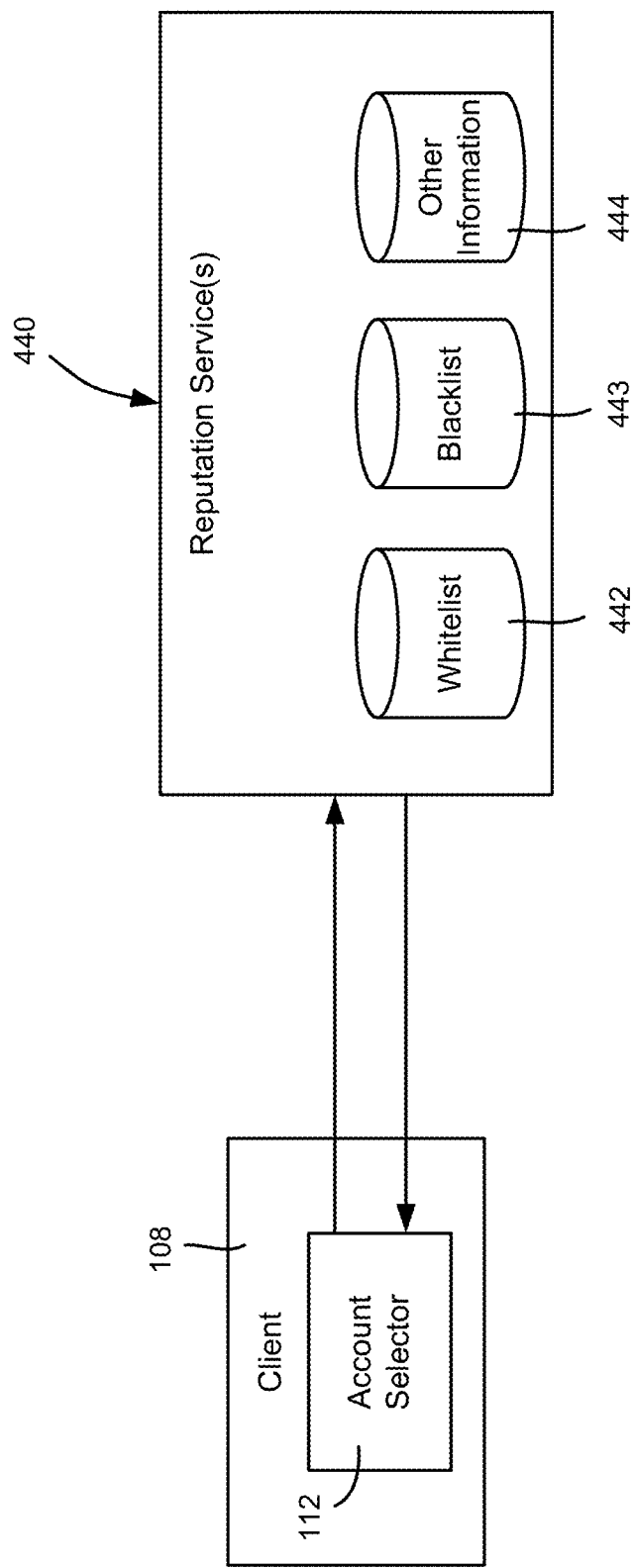
FIG. 4 is a block diagram representing how a client may communicate with one or more reputation services to obtain reputation information regarding identity providers.

As represented in FIG. 4, to ensure the trustworthiness of the information/identity provider acquired via the discovery facilities, a reputation service 440 comprising one or more local and/or remote mechanisms may be accessed by the account selector 112 (or some agent on its behalf). One such mechanism comprises a whitelist 442 (or the like that maintains a list of the endpoints that present accurate discovery information (e.g. graphics and textual descriptions). The account selector 112 may reference this list prior initiating the discovery process to retrieve identity provider information. This list may be externally managed and maintained in a signed document on a publically accessible website, for example. For identity providers known to be trustworthy, the account selector may, for example, simply allow the redirection if the user selects one. For sites not on the whitelist, a different user experience may be provided, such as a providing a warning before the user is redirected to such an identity provider (at least the first time).

A blacklist 443 of known bad sites is another alternative source of information for a reputation service. If an identity provider is listed on such a blacklist 443, the account selector 112 may, for example, prevent redirection, or make redirection relatively far more difficult to access, e.g., several warnings may be provided, including information known about that particular identity provider website.

Other types of information 444 may be accessed by an appropriate local and/or remote reputation service. For example, a browser such as Internet Explorer may provide a smart filtering service based upon heuristics that determine trustworthy websites versus non-trustworthy ones. This information may be leveraged by the account selector 112, possibly in combination with other reputation service information.

Other industry mechanisms directed towards reputation include an extended validation (EV) class of certificates, which are only granted to entities that undergo a certain legal/procedural vetting process. Governmental entities also may certify entities corresponding to an identity provider website. Any of this other information 444 may be provided to the account service for use in making reputation-based decisions on how to differentiate (e.g., visibly by appearance and/or location) identity providers from one other when presenting them to users, and/or how to operate to provide an appropriate level of security when one is selected.

Exemplary Operating Environment

Figure 5:
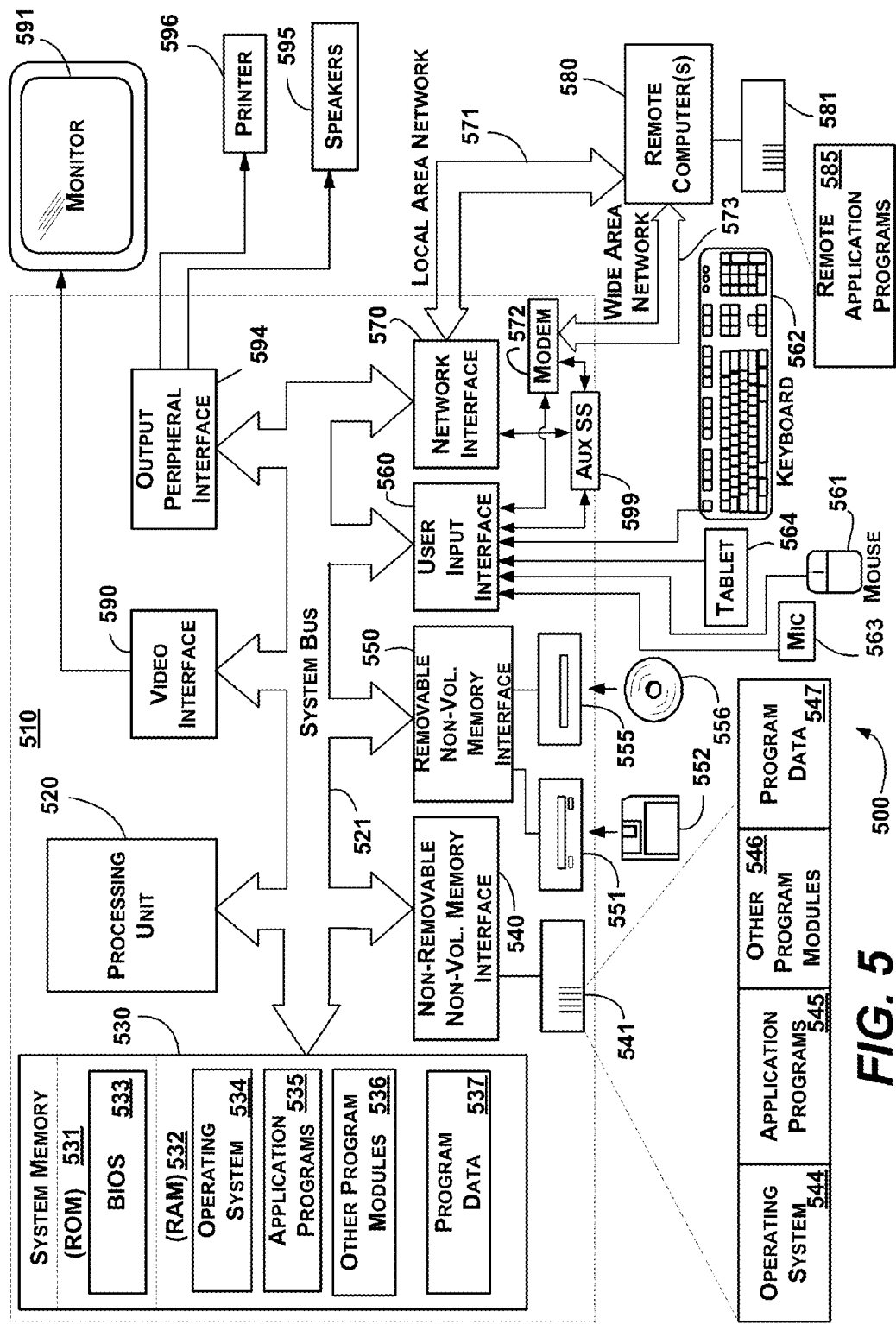
FIG. 5 shows an illustrative example of a computing environment into which various aspects of the present invention may be incorporated.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component such as comprising an interface and antenna may be coupled through a suitable device such as an access point or peer computer to a WAN or LAN. In a networked environment, program modules depicted relative to the computer 510, or portions thereof, may be stored in the remote memory storage device.

By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method employing at least one processor to perform steps comprising: receiving a page from a site, the page corresponding to a passive authentication protocol sign-in from a relying party; invoking an account selector based upon information comprising data in the page from the site, the account selector providing one or more identity provider options to a user for selecting an identity provider, including differentiating between identity providers based upon reputation information and historical information related to previous identity provider usage, wherein a browser component extension invokes the account selector upon detection of the data in the page; receiving user interaction to select an identity provider as a selected entity provider; and sending an authentication request to the selected identity provider on behalf of the relying party.

2. The method of claim 1 further comprising, communicating with a reputation service to obtain reputation information corresponding to at least one identity provider.

3. The method of claim 2 wherein providing the one or more identity provider options for selecting an identity provider includes presenting a visible representation of a plurality of identity providers to the user.

4. The method of claim 2 wherein providing the one or more identity provider options for selecting an identity provider includes automatically selecting the identity provider based upon a previous user interaction.

5. The method of claim 1 further comprising, parsing the page via a browser component that detects the data, and invoking the browser component extension based upon the data.

6. The method of claim 1 further comprising maintaining the historical information related to user selection of the selected identity provider.

7. The method of claim 1 further comprising, receiving data from the relying party, the data corresponding to one or more suggested identity providers for providing the one or more identity provider options.

8. The method of claim 1 further comprising, performing a discovery process to obtain an image or a descriptive name representative of an identity providers, or both an image and a descriptive name, for providing as information with the one or more identity provider options provided to the user.

9. The method of claim 1 further comprising, receiving an authentication response from the selected identity provider, and sending the authentication response to the relying party.

10. The method of claim 1 wherein receiving the user interaction to select the identity provider comprises receiving text at a text input area.

11. In a computing environment, a system comprising, at least one processor, a memory communicatively coupled to the at least one processor and including components comprising: a browser component that receives a passive authentication protocol sign-in page from a relying party; an account selector invoked by a browser component extension upon detection of particular information that comprises data in the sign-in page, the account selector including an interactive user interface that uses historical information to present one or more selection options that each correspond to an identity provider based upon reputation information for that identity provider and detects user interaction detected towards identifying a selected identity provider, the account selector further configured to construct and send an authentication request to a selected identity provider via the browser component; and the browser receiving an authentication response from the identity provider and communicating the authentication response to the relying party.

12. The system of claim 11 wherein the particular information provided by the relying party comprises an object tag in the sign-in page.

13. The system of claim 11 wherein the account selector is invoked by a browser component extension that is invoked by the browser upon detection of the particular information in the sign-in page.

14. The system of claim 11 wherein the account selector communicates with a reputation service to obtain reputation information regarding at least one identity provider.

15. The system of claim 14 wherein the reputation information corresponds to data provided from a whitelist, a blacklist, a filtering service, a set of extended validation certificates, or a set of government-certified entities, or any combination of a whitelist, a blacklist, a filtering service, a set of extended validation certificates, or a set of government-certified entities.

16. The system of claim 11 further comprising historical information corresponding to previous identity provider usage, and wherein the account selector uses the historical information to present the one or more selection options.

17. One or more computer-readable hardware media having computer-executable instructions, which when executed perform steps, comprising: (a) receiving a passive authentication protocol sign-in page, the sign-in page including particular data; and (b) parsing the page to detect the particular data in the page, and in response to the particular data, determining whether an account selector is able to be invoked, and if so invoking the account selector, the account selector: (i) communicating with a reputation service to obtain reputation information of at least one identity provider; (ii) presenting identity provider options for selection, including differentiating between identity providers based upon the reputation information and past account usage history of user selection of each identity provider; (iii) receiving user interaction to select a presented identity provider as a selected entity provider; and (iv) constructing an authentication request for sending to the selected identity provider on behalf of a relying party.

18. The one or more computer-readable hardware media of claim 17 having further computer-executable instructions comprising, providing visible information based upon the reputation information for at least one identify provider.

19. The one or more computer-readable hardware media of claim 17 wherein an account selector is not able to be invoked, and having further computer-executable instructions comprising, allowing interaction with content of the sign-in page to allow selection of an identity provider via the relying party.

20. The one or more computer-readable hardware media of claim 17 wherein detecting the particular data in the page comprises parsing the page via a browser component, and wherein invoking the account selector comprises, invoking a browser component extension upon detecting the particular data, the browser component extension invoking the account selector.

* * * * *